(12) United States Patent
Kim (10) Patent No.: US 11,002,685 B2
(45) Date of Patent: May 11, 2021

(54) SURFACE FOREIGN SUBSTANCE DETECTOR FOR TRANSPARENT OR TRANSLUCENT FILM

(71) Applicant: JEDEX INC., Yongin-si (KR)

(72) Inventor: Jin Ho Kim, Suwon-si (KR)

(73) Assignee: JEDEX INC., Yongin-si (KR)

( * ) Notice: Subject to any disclaimer, the term of this patent is extended or adjusted under 35 U.S.C. 154(b) by 0 days.

(21) Appl. No.: 16/643,392

(22) PCT Filed: Jun. 28, 2018

(86) PCT No.: PCT/KR2018/007333
§ 371 (c)(1),
(2) Date: Feb. 28, 2020

(87) PCT Pub. No.: WO2019/027143
PCT Pub. Date: Feb. 7, 2019

(65) Prior Publication Data
US 2020/0292461 A1  Sep. 17, 2020

(30) Foreign Application Priority Data

Aug. 2, 2017  (KR) .................... 10-2017-0098091

(51) Int. Cl.
*G01N 21/88* (2006.01)
*B03C 3/017* (2006.01)
*G01N 21/958* (2006.01)

(52) U.S. Cl.
CPC ......... *G01N 21/8806* (2013.01); *B03C 3/017* (2013.01); *G01N 21/958* (2013.01); *G01N 2021/8816* (2013.01)

(58) Field of Classification Search
CPC ........... B03C 3/017; G01N 2021/8816; G01N 21/88; G01N 21/8806; G01N 21/94;
(Continued)

(56) References Cited

U.S. PATENT DOCUMENTS 4,152,053 A * 5/1979 Menary .................. G03D 15/00
15/100
2002/0018201 A1* 2/2002 Young, Jr. .......... G01N 21/8916
356/239.2

FOREIGN PATENT DOCUMENTS

JP  2000-171401 A  6/2000
JP  2000-180371 A  6/2000
(Continued)

*Primary Examiner* — Tri T Ton
(74) *Attorney, Agent, or Firm* — Novick, Kim & Lee, PLLC; Jae Youn Kim (57) ABSTRACT

Disclosed is a surface foreign substance detector for a transparent or translucent film. The surface foreign substance detector for a transparent or translucent film according to the present invention comprises: an optical unit; an optical housing accommodating the optical unit therein; a light emission unit emitting light to the film; and a film holder providing a loading surface such that the film can be loaded thereon and made of a light-absorbing material capable of absorbing light or reflecting the light at a predetermined ratio or less. According to the present invention, the holder supporter is manufactured by using a material capable of generating a predetermined electrostatic force or more between the holder supporter and the foreign substances floating in a surrounding space to prevent foreign substances floating or scattered in a surrounding work space from being moved to the film side, thereby improving detection reliability.

9 Claims, 10 Drawing Sheets

(58) Field of Classification Search
CPC ............... G01N 21/956; G01N 21/958; G01N 21/8851; G02F 1/13; G02F 1/1309
USPC ...................... 356/237.1–237.6, 239.1–239.8
See application file for complete search history.

(56) References Cited

FOREIGN PATENT DOCUMENTS

| | | |
|---|---|---|
| JP | 2016-045039 A | 4/2016 |
| KR | 10-2011-0024608 A | 3/2011 |
| KR | 10-1042143 B1 | 6/2011 |
| KR | 10-1582461 B1 | 1/2016 |

\* cited by examiner

SURFACE FOREIGN SUBSTANCE DETECTOR FOR TRANSPARENT OR TRANSLUCENT FILM

TECHNICAL FIELD

The present invention relates to a foreign substance detector and more particularly, to a surface foreign substance detector for a transparent or translucent film capable of greatly improving detection reliability by detecting contaminated particles using a sample for detecting a degree of contamination in a clean room, a workplace, and the like.

BACKGROUND ART

In general, as the industry becomes more advanced, a need to control particles such as dust has been increased in production sites as well as in official environments. In order to prevent adverse effects of the particles on a product by keeping the production site clean at all times, a clean room has been introduced.

Such a clean room is a space in which contamination control is performed by controlling a concentration of airborne particles within a specified cleanliness level limit and refers to a space which is controlled and managed even in environmental conditions such as temperature, humidity, room pressure, illuminance, noise, vibration, etc. Currently, the clean room is being introduced and operated in various industries such as semiconductors, LCD displays, flights, pharmaceuticals, hospitals, and foods.

In particular, in a high-tech industry including nano-scale and high-precise processes such as a semiconductor manufacturing process and an LCD display manufacturing process, since minute environmental conditions at sites where products are manufactured may also greatly affect the quality of the products, the cleanliness required in the clean room is gradually increasing. For example, in the semiconductor manufacturing process, pattern defects caused by depositing particles oscillated from an automated device or the like on a wafer surface have been pointed out as a major cause of yield reduction of the products.

As such, when particles are present at the site of manufacturing the products, the particles may be moved to the products during the manufacturing process to cause fatal product defects. These particles are accumulated in ceilings, walls, floors, production and measurement facilities, and various tools in the site of manufacturing the products and also attached to the surface of worker's clothing. In addition, surface particles which have been accumulated on the surface of a worker, an object, or adjacent portions thereof by causing movement of airflow according to movement of robots, workers, products and the imbalance of spatial temperature to contaminate the products, resulting in product defects.

Further, a test film for detecting surface particles in a clean room has been developed to more easily and accurately detect foreign substances, and the present applicant has developed a foreign substance detector that allows an inspector to accurately and reliably detect the foreign substances using such a test film and proposed the foreign substance detector.

Currently, a device such as a foreign substance inspecting device for a flat panel display device has been developed and applied instead of films such as the test film. However, there is a problem in that the device is difficult to have sufficient reliability in accuracy for detecting the foreign substances, and the inspection results are changed by working environment requirements around the inspection site.

In addition, as the prior art related thereto, Korean Patent Registration No. 10-1042143 (registered on Jun. 10, 2011) is disclosed.

DISCLOSURE

Technical Problem

The present invention is devised to solve the aforementioned problems, and an object of the present invention is to provide a surface foreign substance detector of a transparent or translucent film capable of improving detection reliability of foreign substances on a film surface by emitting light toward a sample film in a full circumference of the sample film and adopting a structure of emitting light from an upper side above the film.

Another object of the present invention is to provide a surface foreign substance detector of a transparent or translucent film capable of preventing contaminated particles from being moved to a sample film by external environmental factors during inspection and minimizing occurrence of errors in measurement results due to variation in a light emission amount by an external light source.

Yet another object of the present invention is to provide a surface foreign substance detector of a transparent or translucent film capable of minimizing errors in measurement results due to deformation of a sample film by heat.

Technical Solution

The present invention provides a surface foreign substance detector of a transparent or translucent film which detects foreign substances attached onto the surface of the film, the surface foreign substance detector comprising: an optical unit; an optical housing accommodating the optical unit therein and formed in a through shape; a light emission unit provided at a lower side of the optical housing to emit the light toward the film; and a film holder provided to be spaced apart from the lower side of the light emission unit to provide a loading surface so that the film is able to be loaded thereon and formed of a light-absorbing material capable of absorbing the light or reflecting the light at a predetermined ratio or less, wherein a guide groove is provided on an upper surface of the film holder to guide the loading position of the film and a through hole is provided in the guide groove to transmit the light emitted from the light emission unit.

Advantageous Effects

According to the surface foreign substance detector of the transparent or translucent film of the present invention described above, the holder supporter is manufactured by using a material capable of generating a predetermined electrostatic force or more between the holder supporter and the foreign substances floating in a surrounding space to prevent foreign substances floating or scattered in a surrounding work space from being moved to the film side, thereby improving detection reliability.

Further, a plurality of light sources is disposed in a circumferential direction of the film and emits light at an emission angle of 5° to 30° from the upper side to the lower side to minimize detection errors of the foreign substances even when the film is bent, thereby improving detection reliability.

Further, the light blocking plate blocks an external light source other than the light source of the light emission unit from being emitted to the film to prevent the occurrence of changes in the measurement results depending on a change in the light emission amount.

Further, the optical housing and the light blocking plate are applied using a thermally conductive material to further prevent the film from being bent or damaged by heat.

Further, the foreign substance fall prevention film is provided in the optical housing to prevent measurement errors from occurring when the foreign substances fall onto the upper portion of the film during the operation of the inspector.

Further, the film holder is applied with the light-absorbing material and provided to have a predetermined internal depth or more to prevent the light passing through the film from being reflected and then introduced within a focal length of the optical length again, thereby improving measurement reliability.

BEST MODE

Hereinafter, exemplary embodiments of the present invention will be described in more detail with reference to the accompanying drawings. However, the present invention is not limited to exemplary embodiments disclosed below but may be implemented in various different shapes, and the exemplary embodiments just complete a disclosure of the present invention and will be provided to completely notify the scope of the present invention to those skilled in the art. In the drawings, like reference numerals designate like components.

A surface foreign substance detector (hereinafter, referred to as "a foreign substance detector") of a transparent or translucent film according to a preferred exemplary embodiment of the present invention is provided, for example, to detect foreign substances (particles) attached onto a sample film (hereinafter, referred to as "a film") for detecting particles in a clean room, a workplace, and the like in order to measure a contamination degree by surface particles in the clean room, and configured to more reliably detect the number, size, distribution, and the like of the foreign substances attached onto the film surface.

Specifically, according to the present invention, it is possible to further prevent foreign substances scattered in a surrounding space during an operation of detecting the foreign substances attached onto the film from being attached onto the film while being detected, minimize the deterioration in the detection reliability of the foreign substances attached onto the surface of the film by an ambient external light source, and further improve reliability so as to efficiently detect the foreign substances even when the film does not maintain a predetermined level or more of flatness.

Hereinafter, the present invention will be described in detail with reference to the accompanying drawings.

Figure 1:
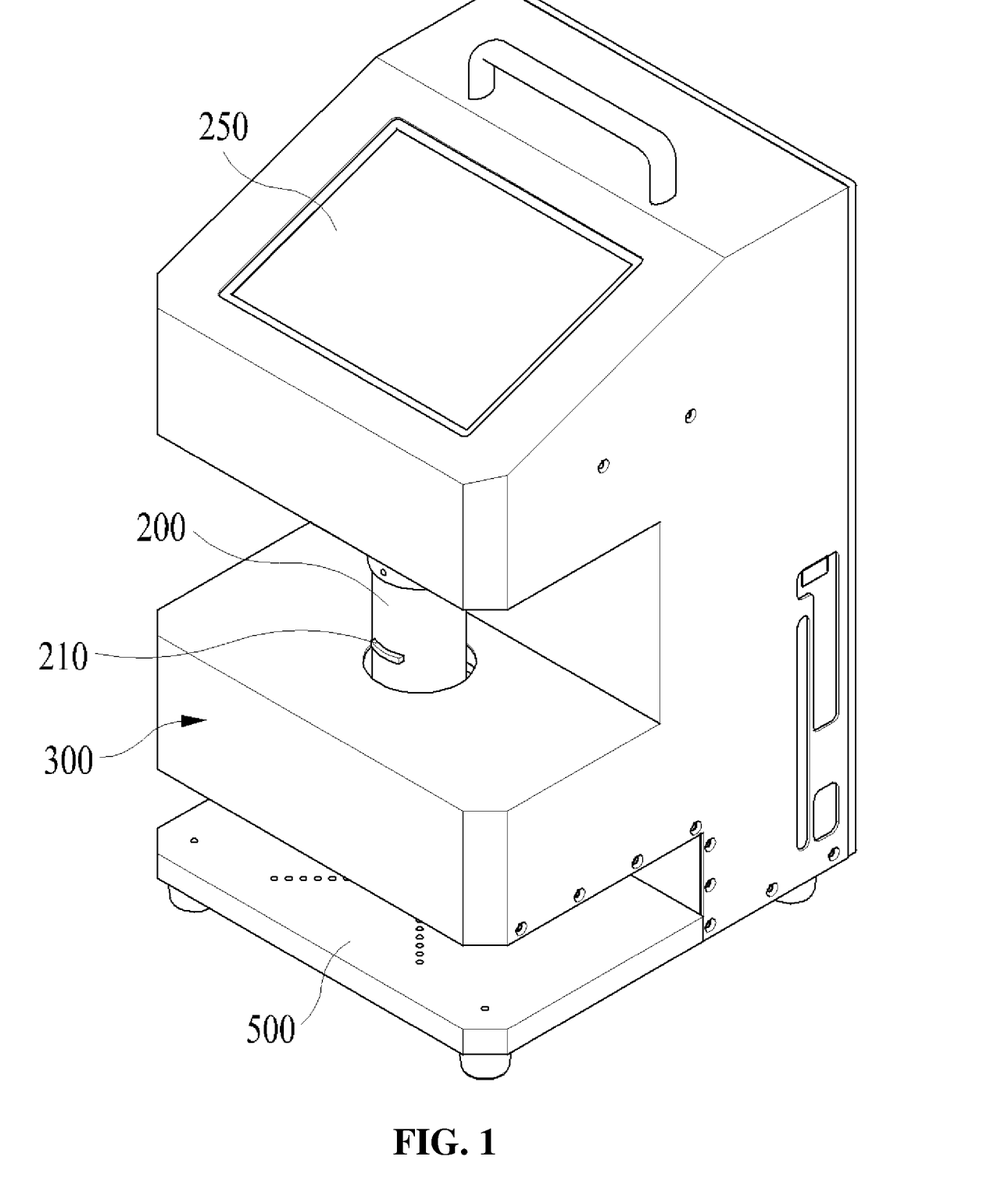
FIG. 1 is a perspective view illustrating a surface foreign substance detector of a transparent or translucent film according to an exemplary embodiment of the present invention.
Figure 2:
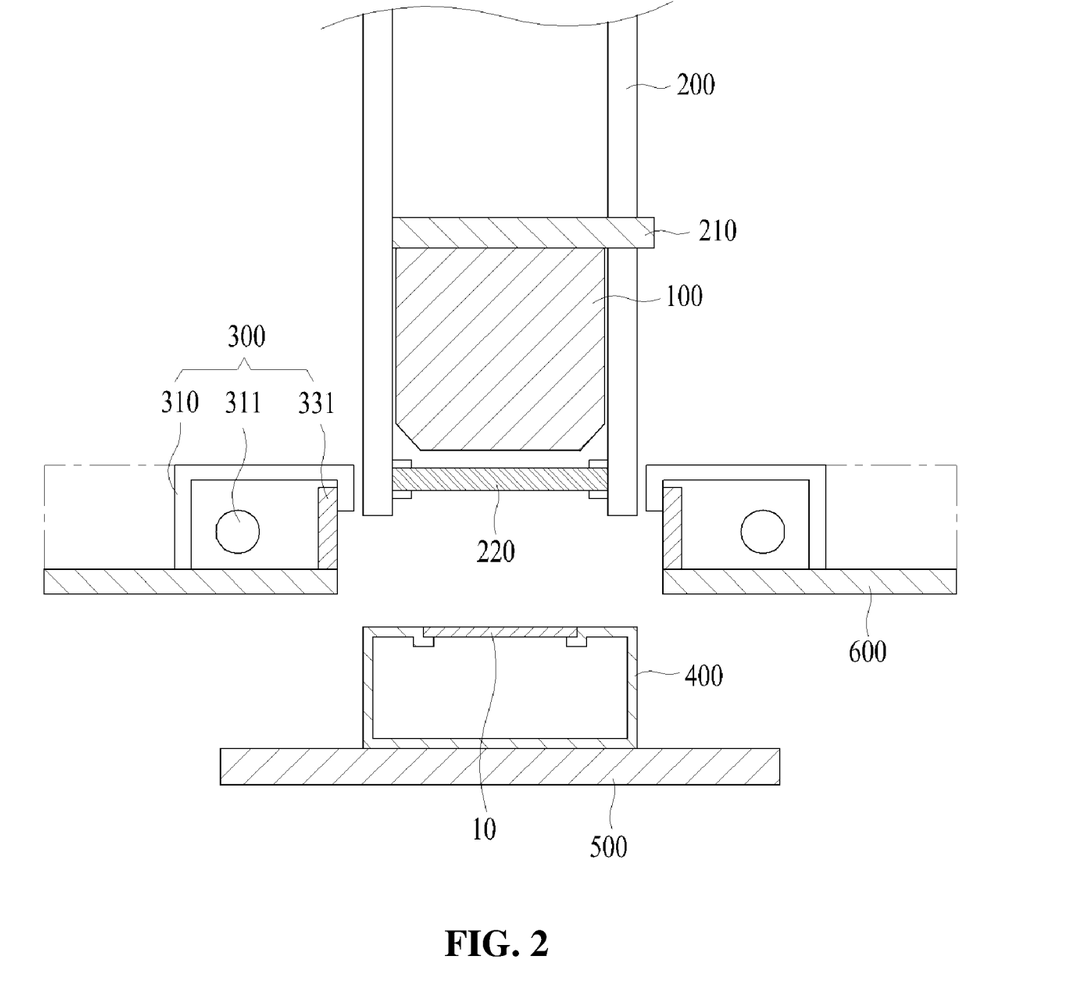
FIG. 2 is a cross-sectional view schematically illustrating the surface foreign substance detector of the transparent or translucent film according to the exemplary embodiment of the present invention.

As illustrated in FIGS. 1 and 2, the foreign substance detector according to the exemplary embodiment of the present invention is to detect foreign substances 11 attached onto the surface of a film 10 which is a foreign substance detection sample, and includes an optical unit 100, an optical housing 200 accommodating the optical unit 10 therein and formed in a through shape, a light emission unit 300 provided at a lower side of the optical housing 200 to emit light toward the film 10, wherein the light is to be emitted toward the film 10 from a direction of surrounding a circumference of the film 10, and a film holder 400 provided to be spaced apart from the lower side of the light emission unit 300 to provide a loading surface 410 so that the film 10 is to be loaded thereon and formed of a light-absorbing material capable of absorbing light or reflect the light at a predetermined ratio or less.

Further, the present invention further includes a holder supporter 500 supporting the film holder 400 from the lower portion of the film holder 400, and a light blocking plate 600 provided below the light emission unit 300 to block light emitted from an ambient external light source from being transmitted to the film 10 side.

In the following description, the film 10 is made of a transparent or translucent plastic material, and an adhesive layer for adsorbing the foreign substances is provided and a release paper is attached onto one surface of the film 10. An inspector performs a detection operation by separating the release paper, adsorbing the foreign substances attached onto the surface of a wall surface, a ceiling wall, working clothes, working machines, etc. in a clean room or a workplace through the adhesive layer, and then attaching the release paper again. The film 10 includes a configuration disclosed in Korean Patent Registration No. 10-1582461 (Title of the invention: Test film for detecting surface particles in clean room) previously registered by the applicant of the present invention.

First, the optical unit 100 may be applied as a microscope, a magnifying glass, an image sensor, or the like, and in the exemplary embodiment of the present invention, as an example, the optical unit 100 may be applied as a microscope (including an electron microscope) that easily adjusts a focal length.

Next, the optical housing 200 is formed in a hollow through shape so as to accommodate the optical unit 100 therein. The optical housing 200 is provided with a control switch 210 so as to allow the inspector to easily control a focal length of the optical unit 100, that is, the microscope if necessary. For example, in the optical housing 200, a cutout may be formed so that a part of the control switch 210 is exposed to the outside of the optical housing 200 to be handled by the inspector by hand.

Figure 3:
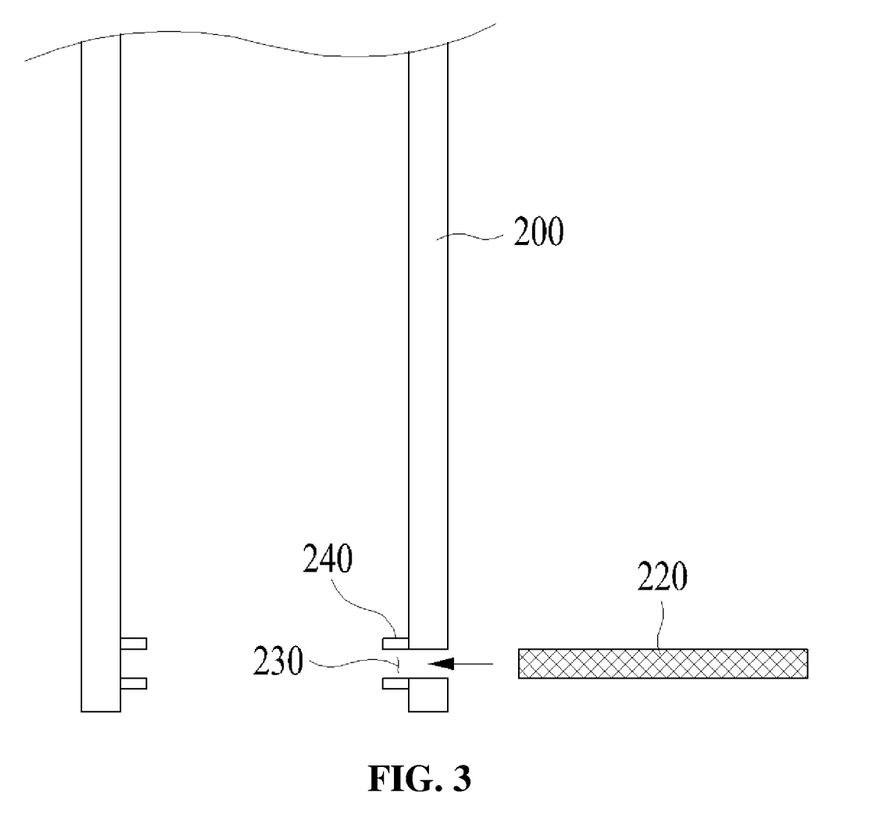
FIG. 3 is a view illustrating a replacement state of a foreign substance fall prevention film of the surface foreign substance detector of the transparent or translucent film according to the exemplary embodiment of the present invention.

As described below, the film 10 is disposed in a downward direction of the optical unit 100, the optical unit 100 can detect the number, size, distribution, and the like of the foreign substances by light which is emitted from a light source to be described below, reflected or scattered by the foreign substance on the film 10, and then introduced to the optical unit 100 again. In detail, the optical unit 100 observes a reflection light generation portion by the foreign substances, and since the reflection light does not occur in the portion without the foreign substances, the optical unit 100 detects the foreign substances through the result shown in the form of a dark or black region. Meanwhile, the control switch 210 is provided in the optical housing 200, and the foreign substances are generated during the switch operation by the inspector to fall onto the upper portion of the film 10 along the inner space of the optical housing 200. In this case, foreign substances that are not actually foreign substances in the clean room, that is, are not detection targets are attached onto the film 10 to deteriorate the detection reliability of the foreign substances due to distortion of the detection result. In order to solve this problem, the present invention provides a foreign substance fall prevention film 220 as illustrated in FIGS. 2 and 3.

The foreign substance fall prevention film 220 is provided below the optical housing 200, prevents foreign substance that may be generated in the optical housing 200 from falling onto the film 10, and may be made of a transparent material so as not to prevent the detection of the foreign substances of the optical unit 100. Here, the foreign substance fall prevention film 220 may be made of any one material of glass, quartz, and acryl, and may be interchangeably installed in the optical housing 200 so as to facilitate surface cleaning after a long-term use. To this end, as illustrated in FIG. 3, a prevention film cutout 230 may be provided in the optical housing 200, guide ribs 240 spaced apart from each other in a vertical direction may be provided to stably install the foreign substance fall prevention film 220 and guide the installation of the foreign substance fall prevention film 220 around the prevention film cutout 230, and the inspector may slidely move the foreign substance fall prevention film 220 in a lateral direction of the optical housing 200 so that the foreign substance fall prevention film 220 is able to be installed in or detached from the optical housing 200.

As illustrated in FIG. 1, a separate display 250 may be provided on the upper side of the optical housing 200 so that the inspector further enlarges an image detected from the optical unit 100, for example, a microscope so as to easily check the image.

Figure 4:
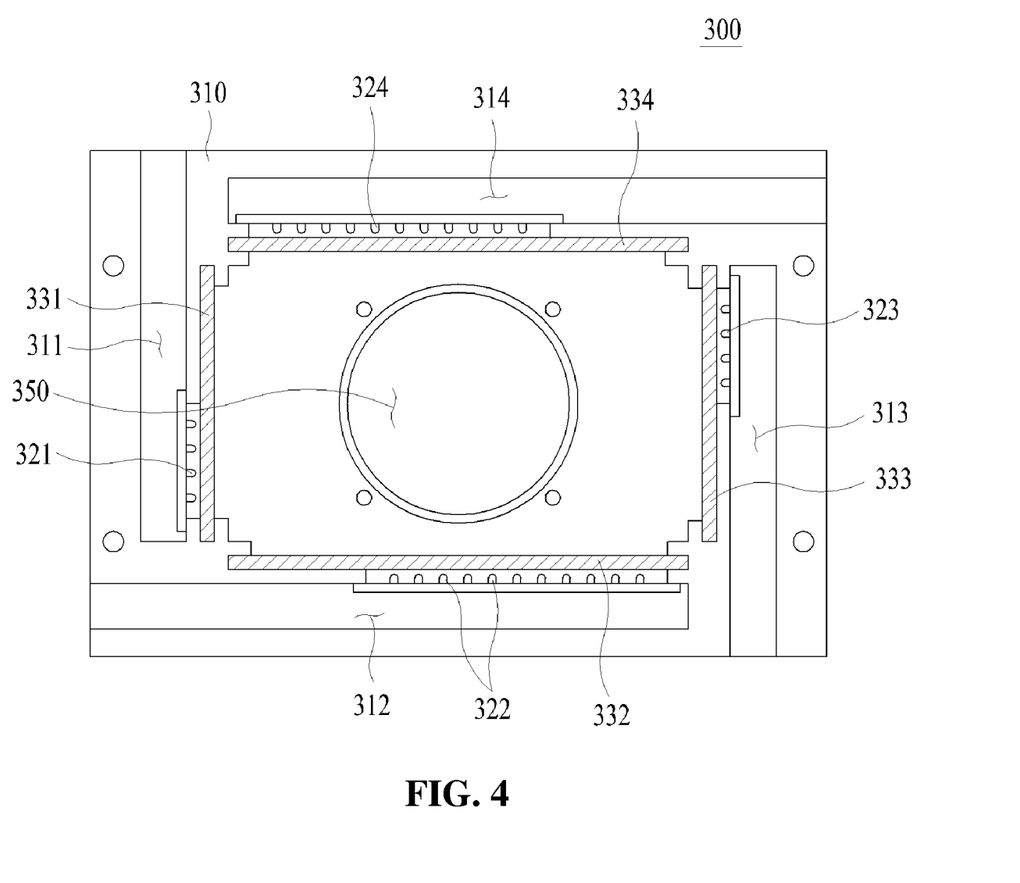
FIG. 4 is a bottom view illustrating a light emission unit of the surface foreign substance detector of the transparent or translucent film according to the exemplary embodiment of the present invention.

Next, as illustrated in FIGS. 2 and 4, the light emission unit 300 emits light onto the film 10 and the optical unit 100 detects light reflected from the foreign substances to effectively detect the presence or absence of the foreign substances attached onto the surface of the film 10. In the exemplary embodiment of the present invention, the light emission unit 300 is spaced apart from the film 10 at a predetermined distance or more and configured to emit light toward the film 10 in a plurality of directions of the circumference of the film 10. An imaginary line of FIG. 2 means a housing forming an appearance. In other words, the light emission unit 300 may emit the light toward the film 10 in a plurality of directions, such as two directions, three directions, four directions, five directions, and six directions or more of the circumference of the film 10. Hereinafter, a detailed description of the light emission unit 300 will be described based on a case of emitting light in four directions of the circumference of the film 10 for convenience of description, but is not necessarily limited to those described above.

As illustrated in FIG. 4, the light emission unit 300 includes a light emission body 310 in which an empty space is formed in a central region corresponding to an arrangement position of the film 10, first to fourth light sources 321, 322, 323, and 324 provided in the first to fourth sections 311, 312, 313, and 314 of the light emission body 310 corresponding to a circumferential direction including front and rear and left and right directions of the film 10 to emit the light to the film 10, and first to fourth light diffusion plates 331, 332, 333, and 334 diffusing the light emitted from the first to fourth light sources 321, 322, 323, and 324. The present invention is not limited thereto, and the sections may be formed in a ring shape surrounding the circumference of the film 10, and the light sources and the light diffusion plates may be disposed in the ring shape correspondingly.

An opening 350 is formed in the central region of the light emission body 310 so that a lower end of the optical housing 200 is partially inserted, an empty space is provided to communicate with the opening 350, and the film 10 is positioned below the empty space. The first to fourth light sources 321, 322, 323, and 324 are applicable as an LED, a laser, and the like. When the light sources are applied as the LED, it is preferable that the light emitted at a predetermined light emission range angle or more is applied to have sufficient straightness.

The first to fourth light diffusing plates 331, 332, 333, and 334 are provided between the film 10 and the first to fourth light sources 321, 322, 323, and 324, respectively, to increase the uniformity of the light quantity distribution on the surface of the film 10, thereby preventing the occurrence of a phenomenon that the foreign substance size is detected differently according to a difference in the light quantity distribution during the detection by a microscope, an image sensor, and the like.

Figure 6:
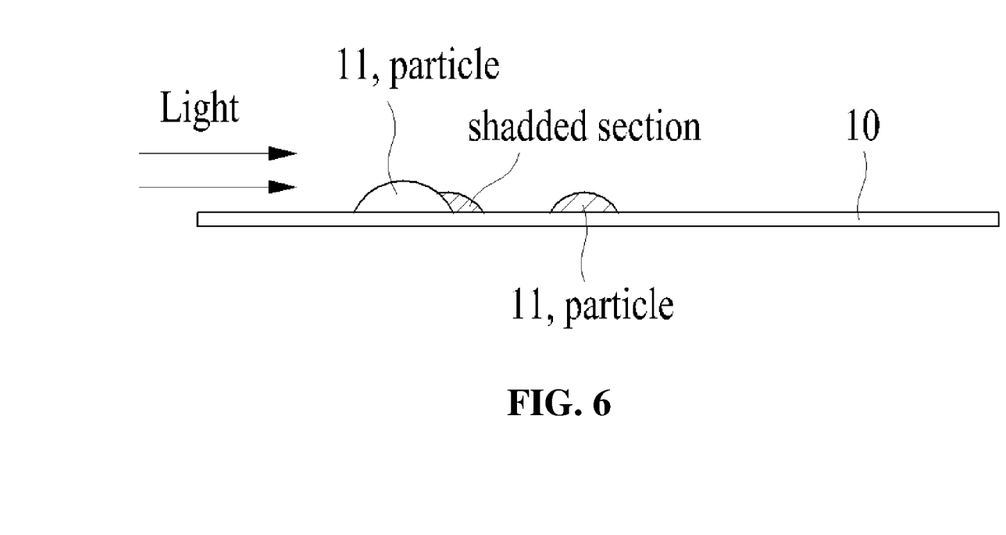
FIG. 6 is a view illustrating an appearance in which adjacent foreign substances are not able to be detected by shaded sections of the foreign substances.

In the present invention, it is possible to more clearly detect the foreign substances 11 by emitting the light toward the film 10 in all directions surrounding the edge of the film 10. In detail, as illustrated in FIG. 6, when the light is emitted only in one direction of the film 10 and a plurality of foreign substances are closely disposed, there is a problem in that a shaded section may occur on the back surface of any one foreign substance 11 by the light emission and it is difficult to properly detect other adjacent foreign substances by such a shaded section. However, in the present invention, as illustrated in FIG. 4, the light is emitted toward the foreign substances 11 attached onto the film 10 in four directions (front, rear, left, and right) of the film 10 to prevent the detection of the foreign substances from being omitted by the shaded section as described above, thereby improving measurement reliability.

Figure 5:
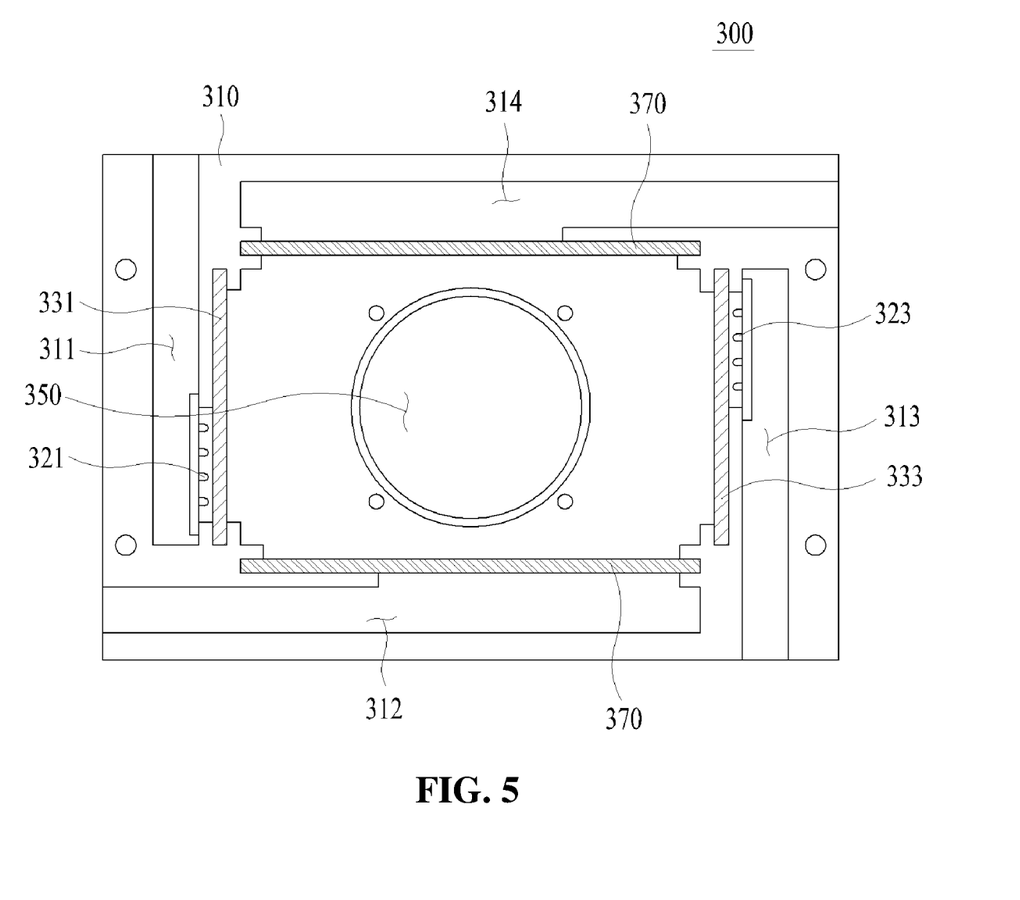
FIG. 5 is a view illustrating another example of FIG. 4.

Meanwhile, in the present invention, as illustrated in FIG. 5, only a reflective plate 370 may also be disposed to emit light in both directions facing each other based on the film 10 without disposing a separate light source in the rest of two directions. In this case, the light emitted from both light sources may be reflected to the reflective plates 370 on both sides to be emitted to the film 10 side again, thereby preventing the foreign substances from being not detected by the shaded section as described above. The reflective plate 370 may be applied with a material and a color capable of reflecting light in a predetermined amount or more, and for example, the reflective plate 370 may be applied in a white color.

Figure 7:
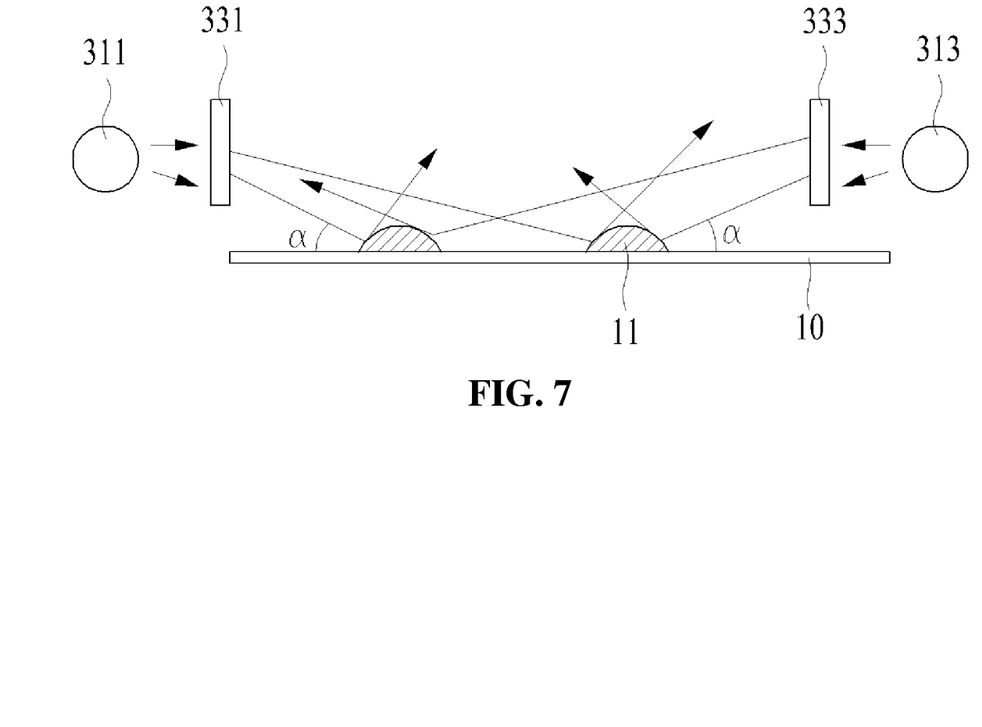
FIG. 7 is a view illustrating a foreign substance detecting process by light emission in the surface foreign substance detector of the transparent or translucent film according to the exemplary embodiment of the present invention.

In addition, as illustrated in FIG. 7, in the present invention, while the film 10 is disposed on the film holder 400, the first to fourth light sources 321, 322, 323, and 324 are positioned above the film 10, and a light emission angle α of the first to fourth light sources 321, 322, 323, and 324 with respect to the film 10 is preferably in the range of 5° to 30°.

Figure 8A:
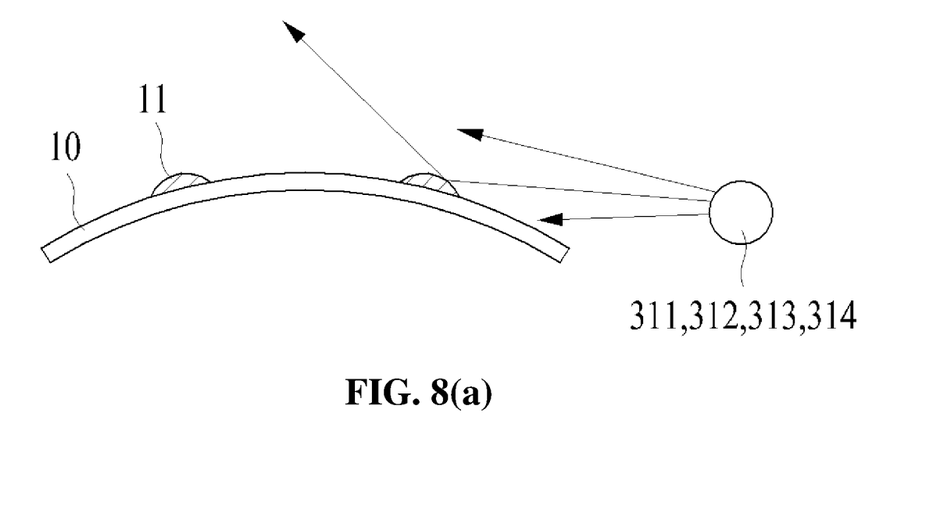
FIG. 8(a) and FIG. 8(b) are views illustrating an appearance in which foreign substances are not able to be detected when the film is bent.
Figure 8B:
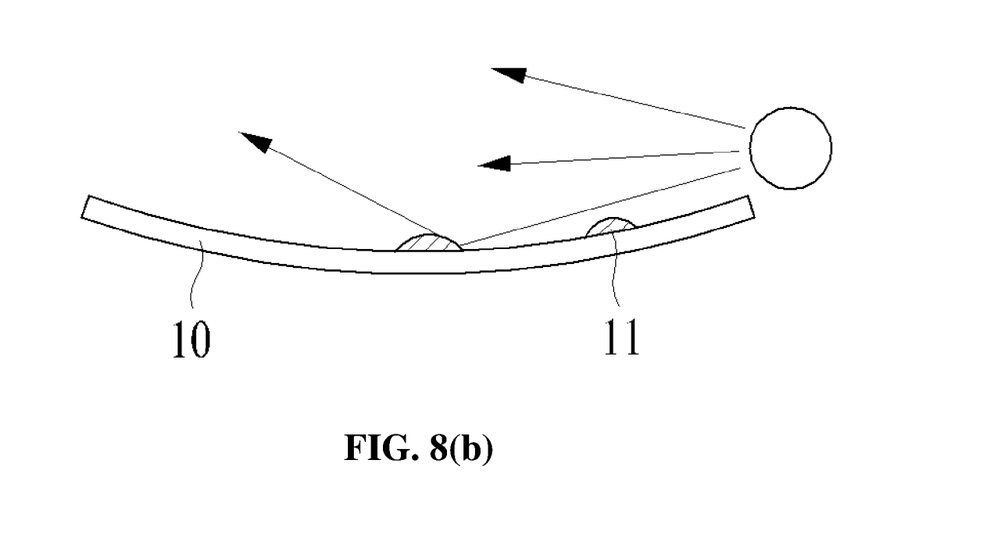

Although the film 10 generally maintains a certain level or more of flatness, as illustrated in FIGS. 8(a) and 8(b), there may be a shape deformation of the film such as bending the film convexly upwards or downwards by the heat generated from the light source. As such, when the foreign substances are detected by using lateral light having an emission angle of 5° or less while the film 10 is slightly bent, a part of the sample surface of the film 10 is out of the light emission range, and thus there is a problem that the detection of the foreign substances detection is omitted. In addition, in the case of detecting the foreign substances using lateral light having an emission angle of more than 30°, there are disadvantages that the installation number of light sources is inevitably increased and the size of the light emission body 310 is increased, and thus the size of the entire detector increases. The present invention has advantages of preventing the detection of the foreign substances from being omitted even while the film 10 is not fully flat by applying emission angles of the first to fourth light sources 321, 322, 323, and 324 in the range of 5° to 30° and more compactly reducing the entire device by reducing an increase in the size of the light emission unit 300.

Figure 9:
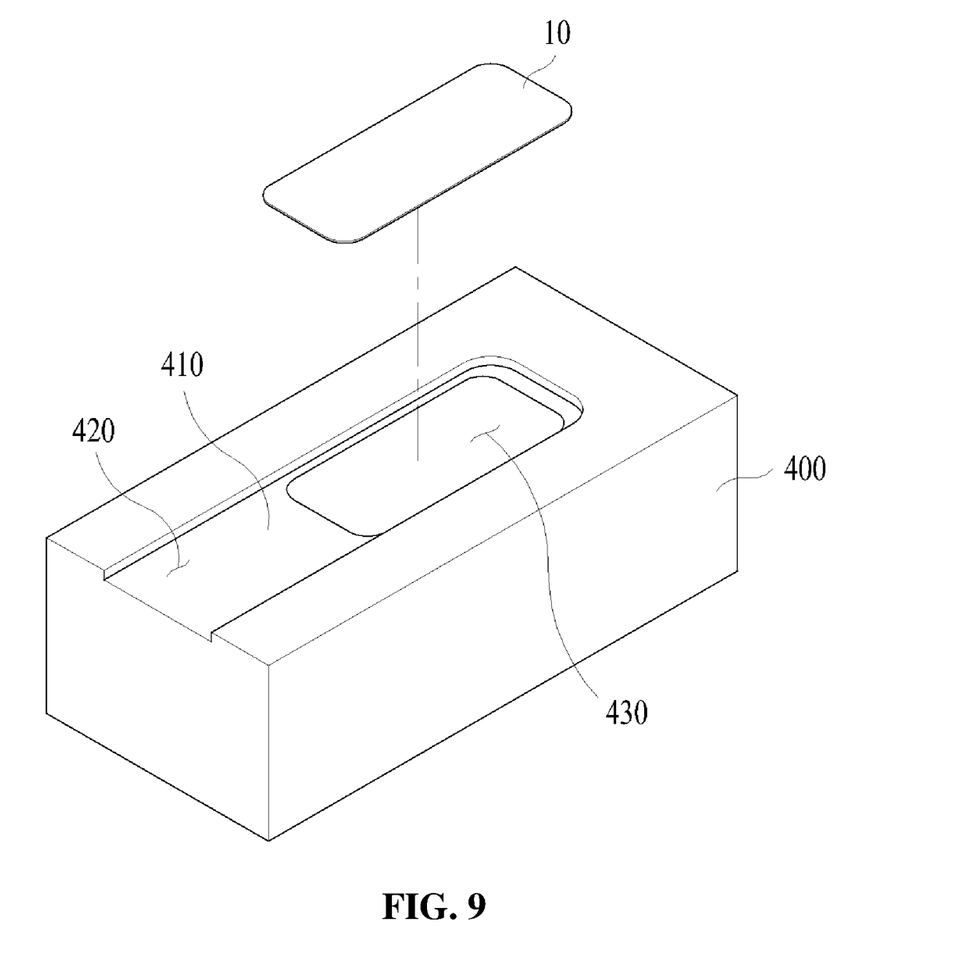
FIG. 9 is a perspective view illustrating a film holder of the surface foreign substance detector of the transparent or translucent film according to the exemplary embodiment of the present invention.

Next, as illustrated in FIGS. 2 and 9, the film holder 400 is spaced apart from the lower side of the light emission unit 300 to provide a loading surface 410 so that the film 10 is able to be loaded thereon and is made of a light-absorbing material capable of absorbing light or reflecting the light at a predetermined ratio or less.

The film holder 400 may be formed in the shape of a hollow cube, a hollow cylinder, a hollow polyhedron, and the like, and a guide groove 420 is provided on the upper surface thereof to guide the loading position of the film 10, and a through hole 430 is provided in the guide groove 420. On the other hand, when the inspector inspects the transparent film 10 by using a microscope or a magnifying glass, if there is reflected light reflected from the film holder 400 under the transparent film 10, there may be a situation that it is difficult or impossible for the optical unit 100 to properly observe the foreign substances, and there may be a problem in that the foreign substances attached onto the inner surface of the film holder 400 are misrecognized as foreign substances of the film 10 which is a sample. In order to solve the misrecognition, in the present invention, the film holder 400 is made of a light-absorbing material of absorbing light or reflecting the light at a predetermined ratio or less. In the exemplary embodiment of the present invention, the film holder 400 may be made of an aluminum material and sandblasts and then black-anodizes the surface thereof (including an inner surface) after sandblasting so as to prevent the light reflection.

Figure 10:
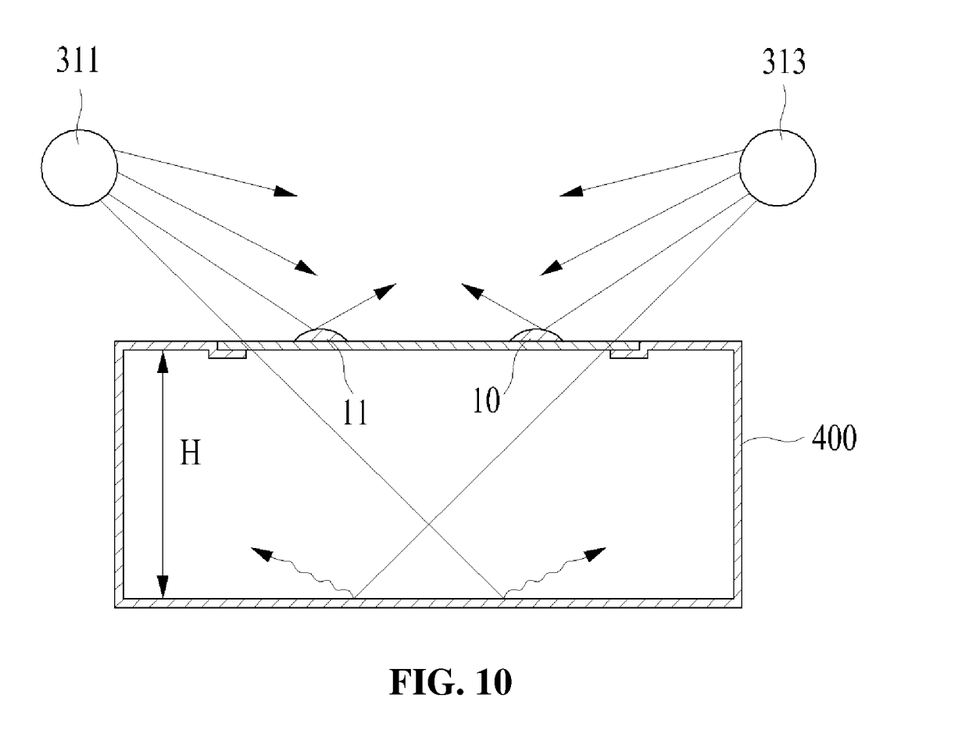
FIG. 10 is a view illustrating a foreign substance detection state of the surface foreign substance detector of the transparent or translucent film according to the exemplary embodiment of the present invention.

In the exemplary embodiment of the present invention, as illustrated in FIG. 10, the film holder 400 may have a predetermined inner area depth H or more so that the light emitted from the light emission unit 300 passes through the film 10, passes through the through hole 430 to be reflected or scattered on its inner bottom surface, and then is not introduced within a focal length of the optical unit 100 again. That is, in the present invention, the film holder 400 has a sufficient inner depth to prevent the occurrence of an error in which the foreign substances present in the film holder 400 are attached onto the lower surface of the film 10 to be detected together with the foreign substances which are normal detected targets attached onto the upper surface of the film 10.

Next, as illustrated in FIGS. 1 and 2, the holder supporter 500 is to support the film holder 400 from the lower side, and in the exemplary embodiment of the present invention, the holder supporter may be made of a material capable of generating a predetermined electric force or more between the holder supporter and the foreign substances floating in the atmosphere of the surrounding space.

In the present invention, the holder supporter 500 is applied as a material that generates a predetermined electric force or more between the holder supporter and the foreign substances floating in the atmosphere of the surrounding space to prevent the foreign substances generated in the inspector and during the inspection from being moved to the surface of the film 10, and specifically, the foreign substances are moved to the holder supporter 500 side before being moved to the surface of the film 10, thereby improving the measurement reliability. Specifically, the holder supporter 500 allows the foreign substances generated in the inspector and during the inspection to be attached onto the surface of the supporter 500 before being moved to the film 10, thereby minimizing the movement to the film 10 of the surrounding foreign substances. In the holder supporter 500, for example, a material of the holder supporter 500 is applicable as Teflon, PVC, polystyrene, polyester, and the like.

Next, as illustrated in FIG. 2, in the light blocking plate 600 blocks external light so that the light emitted from external light sources around the inspection space other than the first to fourth light sources 321, 322, 323, and 324 of the light emission unit 300 is transmitted to the film 10 side to be prevented from affecting detection accuracy of the foreign substances. That is, a central space (film surrounding space) of the light emission unit 300 may be created in a kind of dark atmosphere by the light blocking plate 600.

The light blocking plate 600 is provided to extend to the outside of the light emission unit 300 by a predetermined length or more and made of a light-absorbing material capable of absorbing light or reflecting the light at a predetermined ratio or less. In the exemplary embodiment of the present invention, the light blocking plate 600 may be made of the same/similar aluminum material as/to the film holder 400, and sandblasts and then black-anodizes the surface thereof to prevent light reflection.

Meanwhile, as described above, the film 10 should maintain the flatness as a whole to increase the detection accuracy of the foreign substances. In the present invention, heat generated from the first to fourth light sources 321, 322, 323, and 324 of the light emission unit 300 is transmitted to the film 10, and the film 10 is prevented from being bent or damaged by the heat. As described above, when the film 10 is bent or damaged by the heat, the focal point of the optical unit 100 is changed to cause an error in detection. In order to compensate for this problem, in the present invention, the optical housing 200 and the light blocking plate 600 are made of a thermally conductive material having a predetermined thermal conductivity or higher, respectively, thereby dissipating the heat generated from the light emission unit 300 to the outside.

While the present invention has been described with reference to the accompanying drawings and the preferred exemplary embodiments described above, the present invention is not limited thereto, but is limited by appended claims to be described below. Therefore, those skilled in the art may variously modify and correct the present invention without departing from the technical spirit of the appended claims to be described below.

INDUSTRIAL AVAILABILITY

According to the surface foreign substance detector of the transparent or translucent film of the present invention described above, the holder supporter is manufactured using a material capable of generating a predetermined electrostatic force or more between the holder supporter and the foreign substances floating in a surrounding space to prevent foreign substances floating or scattered in the surrounding workspace from being moved to the film side, thereby improving detection reliability.

The invention claimed is:

1. A surface foreign substance detector of a transparent or translucent film which detects foreign substances attached onto a surface of the film, the surface foreign substance detector comprising:
   an optical unit;
   an optical housing accommodating the optical unit therein and formed in a through shape;
   a light emission unit provided at a lower side of the optical housing to emit the light toward the film;
   a film holder provided to be spaced apart from the lower side of the light emission unit to provide a loading surface so that the film is able to be loaded thereon and formed of a light-absorbing material capable of absorbing the light or reflect the light at a predetermined ratio or less, wherein a guide groove is provided on an upper surface of the film holder to guide a loading position of the film and a through hole is provided in the guide groove to transmit the light emitted from the light emission unit; and
   a holder supporter configured to support the film holder from a lower portion of the film holder,
   wherein the holder supporter is made of a material capable of generating a predetermined electric force or more between the holder supporter and the foreign substances floating in a surrounding space.

2. A surface foreign substance detector of a transparent or translucent film, which detects foreign substances attached onto a surface of the film, the surface foreign substance detector comprising:
   an optical unit;
   an optical housing accommodating the optical unit therein and formed in a through shape;
   a light emission unit provided at a lower side of the optical housing to emit the light toward the film;
   a film holder provided to be spaced apart from the lower side of the light emission unit to provide a loading surface so that the film is able to be loaded thereon and formed of a light-absorbing material capable of absorbing the light or reflect the light at a predetermined ratio or less, wherein a guide groove is provided on an upper surface of the film holder to guide a loading position of the film and a through hole is provided in the guide groove to transmit the light emitted from the light emission unit; and
   a light blocking plate provided below the light emission unit to block light emitted from a surrounding light source from being transmitted to the film side,
   wherein the light blocking plate is provided to extend to an outside of the light emission unit at a predetermined length or more and made of a light-absorbing material capable of absorbing light or reflecting the light at a predetermined ratio or less.

3. The surface foreign substance detector of claim 2, wherein the film holder and the light blocking plate are made of the same material and formed by sand-blasting and then black-anodizing the surface thereof.

4. The surface foreign substance detector of claim 2, wherein the optical housing and the light blocking plate are made of a thermally conductive material having a predetermined thermal conductivity or more, respectively, and emit heat generated from the light emission unit to the outside.

5. The surface foreign substance detector of claim 1, wherein the light emission unit includes: a light emission body having an empty space formed in a central region corresponding to an arrangement position of the film;
   a plurality of light sources provided in sections of the light emission body to emit the light to the film in a plurality of directions; and
   a plurality of light diffusion plates diffusing the light emitted from the plurality of light sources.

6. The surface foreign substance detector of claim 5, wherein while the film is disposed on the film holder, the plurality of light sources is positioned above the film and light emission angles of the plurality of light sources for the film are in the range of 5° to 30°.

7. The surface foreign substance detector of claim 1, wherein a foreign substance fall prevention film made of a transparent material is further provided below the optical housing to prevent foreign substances generated in the optical housing from falling onto the film.

8. The surface foreign substance detector of claim 7, wherein the foreign substance fall prevention film is made of any one of glass, quartz, and acryl and installed interchangeably in the optical housing.

9. A surface foreign substance detector of a transparent or translucent film, which detects foreign substances attached onto a surface of the film, the surface foreign substance detector comprising:
   an optical unit;
   an optical housing accommodating the optical unit therein and formed in a through shape;
   a light emission unit provided at a lower side of the optical housing to emit the light toward the film;
   a film holder provided to be spaced apart from the lower side of the light emission unit to provide a loading surface so that the film is able to be loaded thereon and formed of a light-absorbing material capable of absorbing the light or reflect the light at a predetermined ratio or less, wherein a guide groove is provided on an upper surface of the film holder to guide a loading position of the film and a through hole is provided in the guide groove to transmit the light emitted from the light emission unit,
   wherein the film holder is formed in a hollow cube, a hollow cylinder, a hollow polyhedron, and the like, and the film holder has a predetermined inner area depth or more so that the light emitted from the light emission unit passes through the film to be reflected or scattered on its inner bottom surface, and then is not introduced within a focal length of the optical unit again.

* * * * *